Figure 7:
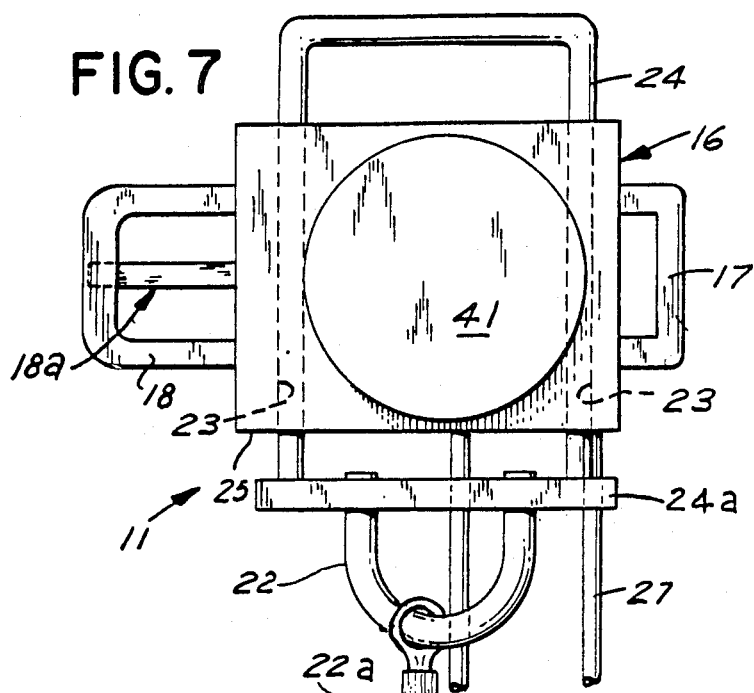
Figures 8, 9:
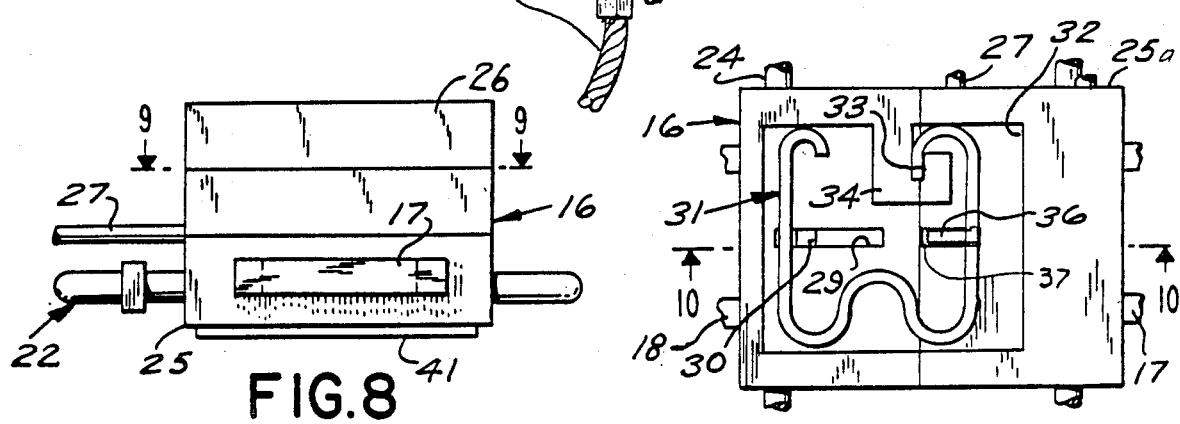
Figures 10, 11:
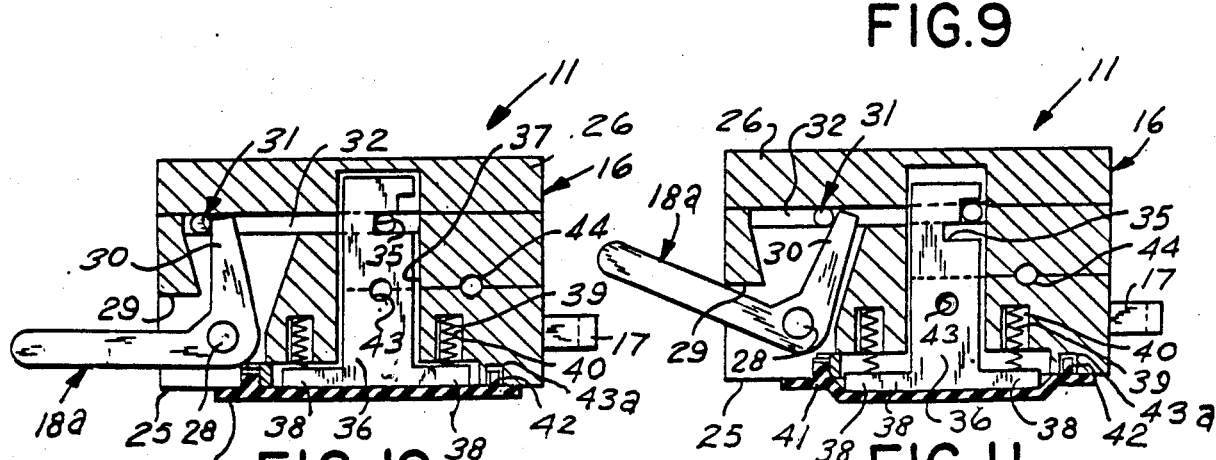

United States Patent [19]

Summerer

[11] Patent Number: 4,621,300

[45] Date of Patent: Nov. 4, 1986

[54] SAFETY MONITORING SYSTEM FOR PUNCH PRESS OPERATORS

[76] Inventor: Ray E. Summerer, 1425 110th Ave., Otsego, Mich. 49078

[21] Appl. No.: 627,680

[22] Filed: Jul. 5, 1984

[51] Int. Cl.$^4$ ............................................. H01H 35/00
[52] U.S. Cl. ..................... 361/175; 361/190; 361/193; 200/DIG. 2; 200/DIG. 36; 307/326; 192/130; 192/131 R
[58] Field of Search ............... 361/175, 176, 177, 190, 361/193; 200/DIG. 2, DIG. 36; 307/326; 192/130, 131 R, 131 H, 134; 308/1 A

[56] References Cited

U.S. PATENT DOCUMENTS

| | | | |
|---|---|---|---|
| 3,700,836 | 10/1972 | Rackson | 200/DIG. 2 |
| 3,784,842 | 1/1974 | Kremer | 340/573 |
| 3,805,085 | 4/1974 | Andrews | 361/177 X |
| 3,947,734 | 3/1976 | Fyler | 308/1 |
| 3,953,770 | 4/1976 | Hayashi | 192/130 |
| 4,193,662 | 3/1980 | Hara | 361/174 X |
| 4,195,722 | 4/1980 | Anderson et al. | 200/DIG. 2 X |
| 4,280,164 | 7/1981 | Kozek | 361/175 X |
| 4,306,314 | 12/1981 | Griffiths | 340/825 X |
| 4,309,696 | 1/1982 | Nagai et al. | 307/326 |
| 4,493,377 | 1/1985 | Günther et al. | 192/131 R X |

OTHER PUBLICATIONS

"Wagner Stops Punch-Press Accidents" by Holtzman American Machinist 2/20/50.

*Primary Examiner*—A. D. Pellinen
*Assistant Examiner*—Derek S. Jennings

[57] ABSTRACT

This safety monitoring system for punch press operators is designed to prevent the operators from being injured by such presses or other factory equipment. Primarily, it consists of a pair of wrist units which are strapped to the wrists of the operators, and which include optical fiber cables and a latching assembly, and the optical fiber cables are used in cooperation with a pair of identical electronic circuits employing LED's, a light sensitive transistor, a pair of other transistors, a zener diode, and a relay, for instantly shutting a punch press on or off.

6 Claims, 11 Drawing Figures

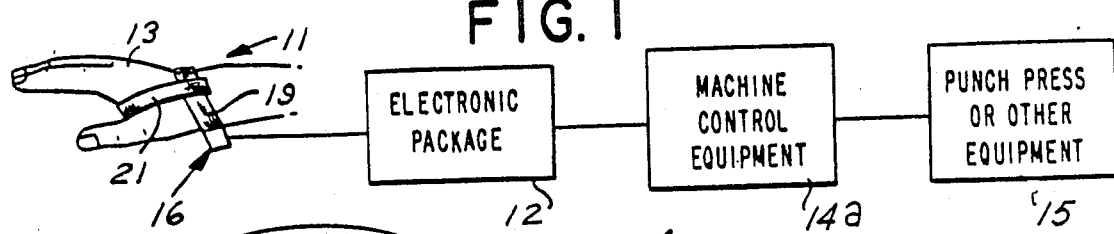
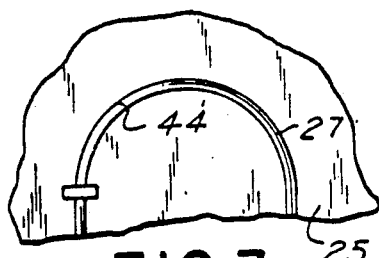
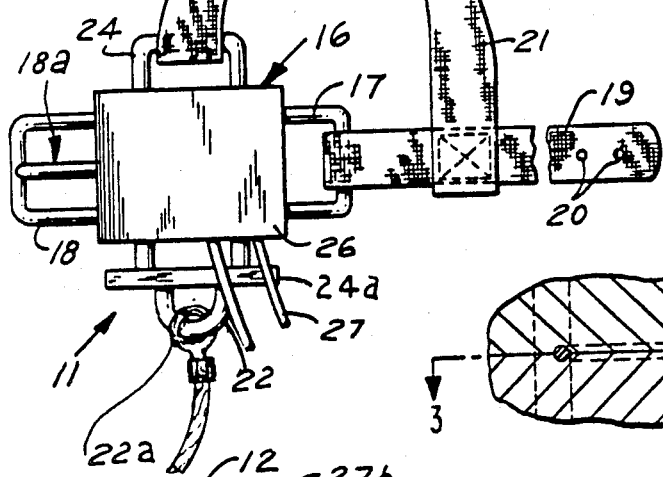
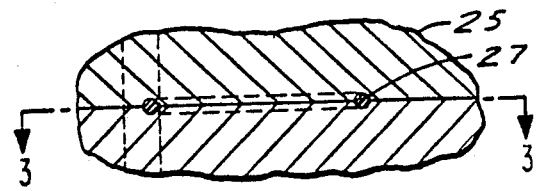
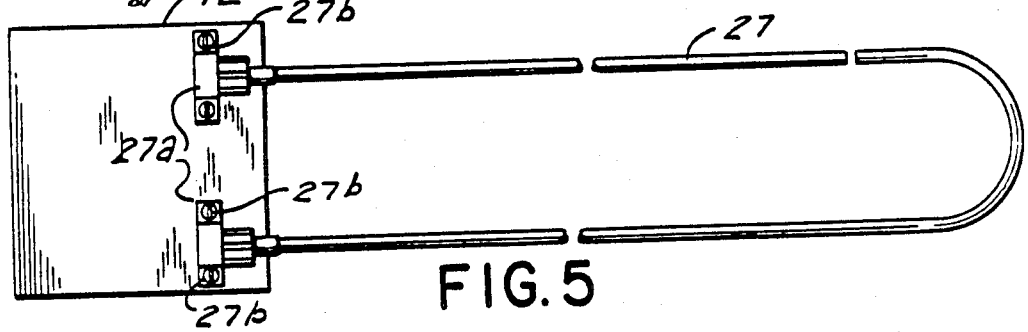
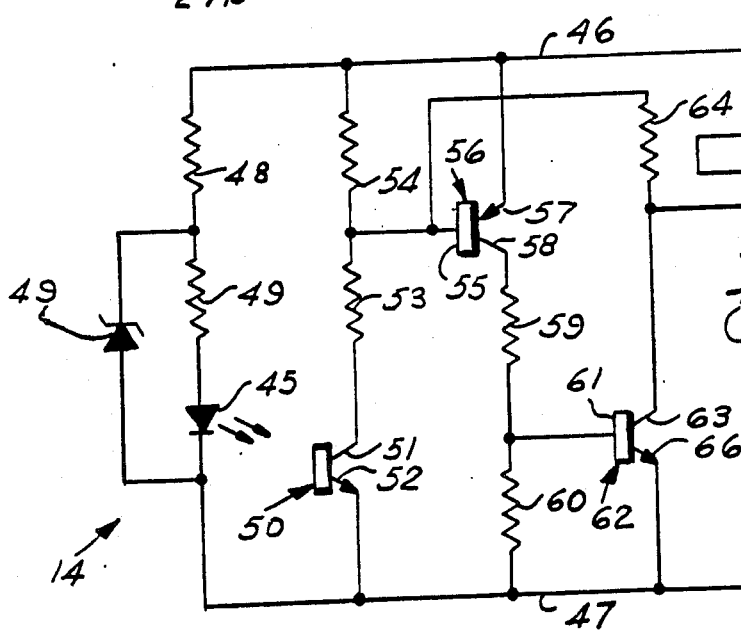
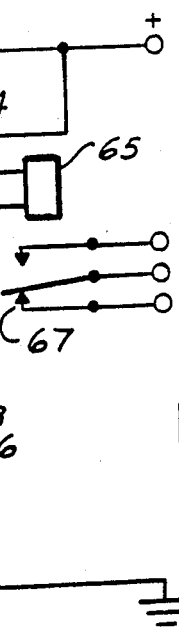

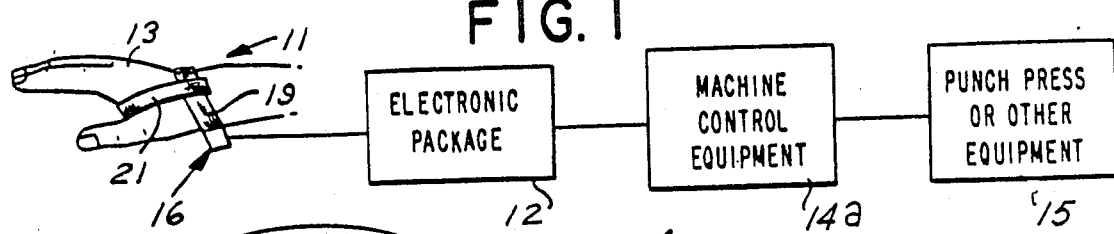
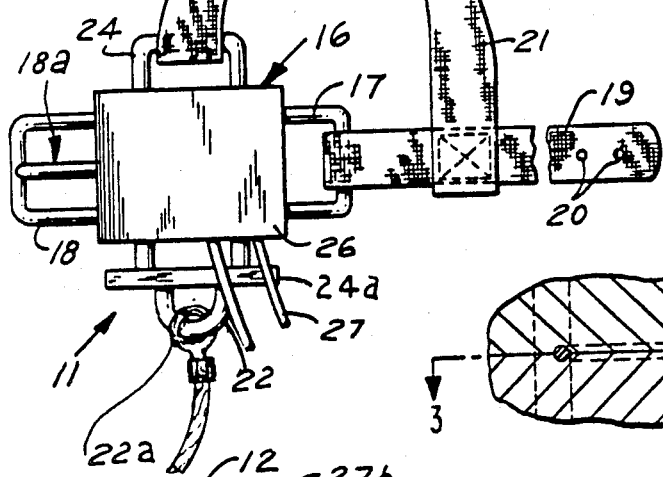
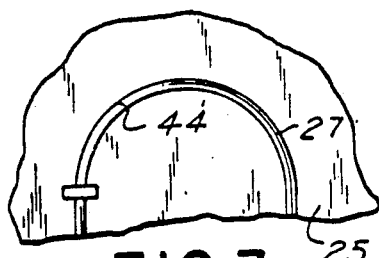
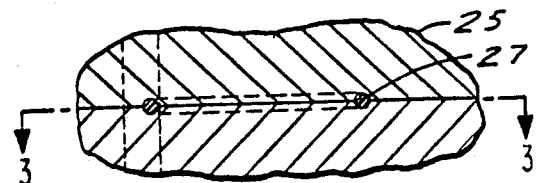
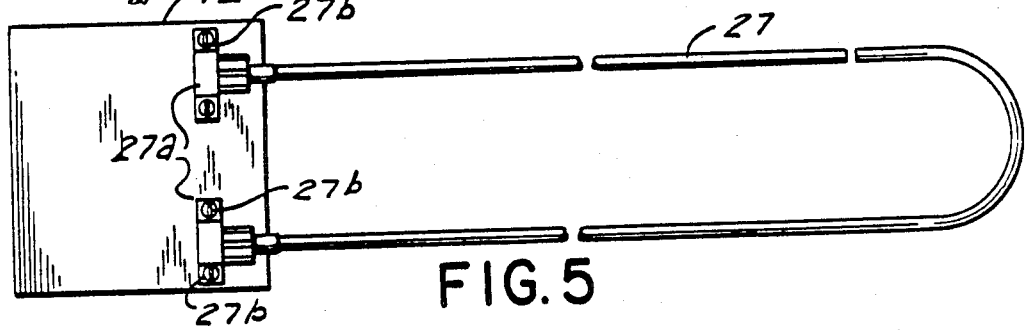
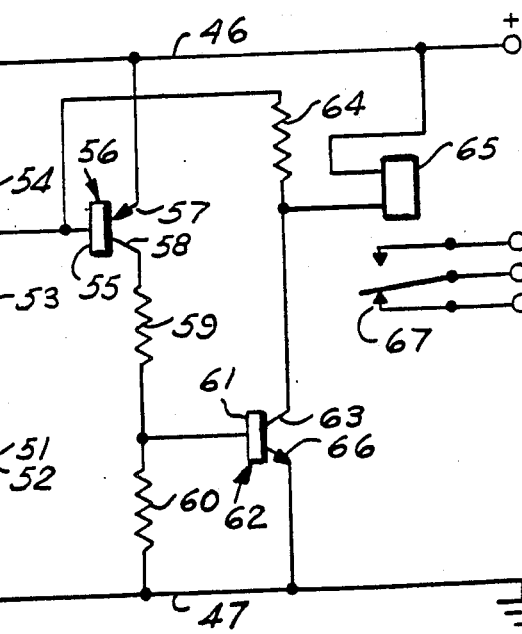

(not shown). A pair of resistors 48 and 49 are coupled across wires 46 and 47, and are in series with LED 45, and a zener diode 49 is coupled across LED 45 and resistor 49, for limiting current flow. A light sensitive transistor 50 is also coupled across wires 46 and 47 by its collector 51 and its emitter 52, the emitter 52 being coupled to the negative side of the power supply, and the collector 51 being coupled in series with resistors 53 and 54. The base 55 of a second transistor 56 is coupled between resistors 53 and 54, and the emitter 57 is coupled to the positive wire 46 of circuit 14. The collector 58 of 56 is coupled in series with resistors 59 and 60, which are coupled to the negative or ground wire 47, and the base 61, of a third transistor 62, is coupled between resistors 59 and 60. The collector 63 of 62 is coupled with a resistor 64 to the base 55 of transistor 56, and the negative side of a relay 65 is coupled between resistor 64 and collector 63 of 62, the emitter 66 of transistor 62 being coupled to the negative or wire 47 of circuit 14. The contacts 67 of relay 65 are coupled in series with the control circuit or circuits of the machinery, which are not shown.

In operation, each wrist unit 11 is placed on the operator's hands by the fingers being inserted within the confines of the straps 21, and strap 19 is then passed through buckles 18 thereof, and fastened by means of buckle tongues 18a and openings 20. When properly mounted on the wrists, the monitoring circuits 14 are completed, thus enabling the punch press 15 or other equipment to operate. The abovementioned is accomplished by moving the latch 36 of each unit 11, by wrist pressure, from an unlatched condition to a latched condition, which is when the wrist strap 19 is captured, and holding the buckle tongue 18a against the buckle 18, which moves the latch spring 31 to lock the latch 36 in position in the lower notch 35. With the latch 36 in the abovementioned position, light from LED 45 is transmitted through aperture 43 by cable 27 means. This transmission energizes the circuits 14, and permits the press 15 to operate.

Two motions are required to set system 10. The first is the moving up of latch 36, and the second is permitting the buckle tongue 18a to move the latch spring 31 into an extended and latch locked condition, and should the buckle 18 be released, the latch spring 31 will automatically release the latch 36 to its normal position, and the mechanical operation of attaching the wrist units 11 sets up the operation of the electronic and electrical system, plus the optical components.

With the twelve volt power supplied to the circuits 14, the LED 45 of each directs light upon the optical 1. A passive safety monitoring system for press operators, comprising in combination:
    a wrist mountable unit containing mechanism which controls light passage through two optical fiber cables secured to said wrist mountable unit when the wrist unit is properly positioned on the wrist of the operator;
    a separate electronic unit which initiates light passage through one of the optical fiber cables to the wrist unit and, also, receives light through the second optical fiber cable from the wrist unit completing a light transmission circuit to activate additional electronic circuitry in the electronic unit to energize press control circuits;
    a press operating system activated by the press control circuits in said additional electronic circuitry.

2. The combination as set forth in claim 1 wherein said wrist unit is one of a pair for each wrist of the press operator, said electronic unit contains light transmitting and receiving circuitry for each of said wrist units of the pair and said wrist unit is secured to the wrists of the operator by a pair of straps.

3. The combination as set forth in claim 2 wherein said wrist unit includes:
    a wrist mountable unit base;
    a first strap receiving eye fixedly secured to one side of the wrist unit base;
    a first strap receiving buckle secured to the wrist unit base opposite to said first strap receiving eye;
    a first adjustable strap affixed to said strap receiving eye wherein said first strap receiving buckle removably receives said first adjustable strap which is fixedly secured to said first strap receiving eye at one end to bind the wrist unit to the wrist of the operator;
    a second strap fixedly secured at one end to said first adjustable strap and the other end to the wrist unit base between the first strap receiving eye and first strap receiving buckle by means of a first ring fixedly secured to the wrist unit base so as to define a hole in said second strap through which the operator places the thumb when affixing said wrist unit to the wrist;
    a second ring fixedly secured to said wrist unit base opposite the first ring to which is attached a press pull back cable.

4. The combination as set forth in claim 3 wherein said wrist unit base contains means for interrupting light transmission through the optical fiber cables comprising:
    a buckle tongue pivotally engaged in said wrist unit through an electronic unit and when the wrist unit is not properly positioned on the operator's wrist the latch means aperture is movably disengaged from the light transmission mode by the action of both the primary and secondary spring means to effect deactivation of the press operating system.

5. The combination as set forth in claim 4 wherein a flexible dust inhibiting diaphragm is in direct contact with the latch mechanism circular base which diaphragm includes integrally attached annular projections frictionally mounted in cutouts in the base of the wrist unit.

6. A wrist-mountable unit for use as part of a passive safety monitoring system which comprises:
   (a) a wrist unit base structure having light optical fiber cable receiving means on the wrist base, for connection to
      a first optical fiber cable for light transmission from a separate light transmitting electronic unit,
      a second optical fiber cable for light transmission through and from said wrist unit base back to said separate light transmitting electronic unit to complete a light transmission circuit through said wrist unit base,
   said wrist unit base structure (a) having a mechanical light transmission control means which includes:
   (a) a buckle tongue pivotally engaged within said wrist unit base with
   (b) a primary spring means within said wrist unit base having said primary spring movement controlled by an operator's action on said buckle tongue,
   (c) movable latch means containing a light transmitting aperture within said wrist unit, said latch means engaged with said primary spring means within said wrist unit and slideable within an opening of the wrist unit base, to control the transmission of light through the aperture thereof, and said latch means having a circular base integrally attached thereto, and
   (d) a second spring means housed in said wrist unit base in pressure contact relation to said latch means circular base so that when the wrist unit is properly positioned on the press operator's wrist by positioning action of the buckle tongue, the primary spring, the circular base and the secondary spring, the aperture of the latch becomes movably positioned so that the latch aperture becomes alignable with the first and second optical fiber cables to permit light transmission through the first optical fiber cable, the aperture of the latch within said wrist unit base and into the second optical fiber cable to complete the light transmission circuit to the electronic unit, and
   when the wrist unit is not properly attached to the press operator's wrist, the light transmitting aperture in said latch means is movably disengaged from its light transmitting position by the action of both the primary and secondary spring means within said wrist unit, so that the latch aperture no longer permits light transmission through the optical fiber cables to deactivate the press operating system.

* * * * *